United States Patent
Attix

Patent Number: 5,367,548
Date of Patent: Nov. 22, 1994

[54] GUIDE TUBE RETAINER

[75] Inventor: Douglas J. Attix, Lynchburg, Va.

[73] Assignee: B&W Fuel Company, Lynchburg, Va.

[21] Appl. No.: 213,321

[22] Filed: Mar. 15, 1994

[51] Int. Cl.⁵ .............................................. G21C 3/30
[52] U.S. Cl. .................................. 376/446; 285/319; 285/921
[58] Field of Search ............... 376/446, 327, 463, 353; 403/329, 330, 380, 327; 285/319, 921, 205, 162, 194

[56] References Cited

U.S. PATENT DOCUMENTS

| | | | |
|---|---|---|---|
| 2,823,932 | 2/1958 | Schigut | 285/921 |
| 3,183,297 | 5/1965 | Curtiss | 285/162 |
| 3,769,158 | 10/1973 | Winders | 376/446 |
| 4,366,116 | 12/1982 | Christiansen et al. | 326/446 |
| 4,610,468 | 9/1986 | Wood | 285/319 |
| 4,820,475 | 4/1989 | Mayers et al. | 376/327 |
| 5,131,687 | 7/1992 | Marchou | 285/314 |
| 5,147,599 | 9/1992 | Mansson | 376/446 |
| 5,232,655 | 8/1993 | Verdier | 376/353 |
| 5,265,141 | 11/1993 | Kobsa | 376/446 |
| 5,268,948 | 12/1993 | Church et al. | 376/446 |

*Primary Examiner*—Behrend E. Harvey
*Attorney, Agent, or Firm*—Robert J. Edwards; D. Neil LaHaye

[57] ABSTRACT

An integral reusable locking arrangement between the guide tube and upper end fitting of a reconstitutable fuel assembly that eliminates all loose fastener components at the reactor site. A retainer sleeve is fabricated as an addition to or part of the upper end sleeve of the guide tube assembly. The retainer sleeve is formed from a cylindrical tube that has a plurality of flexible tabs spaced around the circumference of the tube at the lower end and substantially at the mid section of the tube. The lower tabs serve to center the guide tube in a hole in the upper end fitting or top nozzle. The mid section tabs extend beyond the shoulder of a counterbore in the hole in the upper end fitting or top nozzle and serve to retain the guide tube and upper end fitting in the installed position. A sleeve or collet may be inserted into the counterbore to force the tabs inward and unlock the retainer and guide tube from the upper end fitting.

2 Claims, 2 Drawing Sheets

GUIDE TUBE RETAINER

BACKGROUND OF THE INVENTION

1. Field of the Invention

The invention is generally related to nuclear fuel assemblies and more particularly to a reusable locking arrangement for guide tubes and upper end fittings.

2. General Background

In a nuclear reactor core, each fuel assembly is fitted with a number of guide tubes that are used to receive control rods. In the nuclear industry, the tubes that are used to receive control rods are referred to as guide tubes or thimble tubes and the upper internal structure that these tubes are attached to are referred to as an upper end fitting or a top nozzle, depending on the manufacturer. Therefore, it should be understood that references herein to a guide tube and upper end fitting should be considered as also referring to a thimble tube and top nozzle. The guide tubes have a relative thin wall thickness and thus require a sleeve at the upper end to provide the necessary support for attachment points and shoulder stops. During assembly, the guide tubes are inserted into the spacer grids. The upper end fitting is then aligned with, received on, and attached to the upper end sleeves of the guide tubes. Typically, upper end fittings and sleeves are attached to one another by the use of threaded joints and locking cups. When it becomes necessary to remove an irradiated fuel assembly upper end fitting or nozzle at the reactor site, the work must be done with remotely controlled tooling under water. This results in the handling of a number of parts and provides the potential for cross threading the fasteners during installation. The remote handling of a number of parts under water increases the potential for loose parts in the system that can damage the reactor and increases working time. Patents directed to nuclear fuel assembly end fitting retainers that applicant is aware of include the following.

U.S. Pat. No. 3,769,158 discloses the use of an end fitting over fuel rods where a reduced neck extending through the opening in the end fitting has resilient split rings in grooves and engage the end fitting.

U.S. Pat. No. 3,828,868 discloses guide tubes that are threadably attached to the end fitting.

U.S. Pat. No. 4,699,761 discloses the use of a threaded sleeve on the upper end of the guide tube.

SUMMARY OF THE INVENTION

The invention addresses the above need. What is provided is an integral reusable locking arrangement between the guide tube and upper end fitting that eliminates all loose fastener components at the reactor site. A retainer sleeve is fabricated as part of the upper end sleeve of the guide tube assembly. The retainer sleeve is formed from a cylindrical tube that has a plurality of flexible tabs spaced around the circumference of the tube at the lower end and substantially at the mid section of the tube. The lower tabs serve to center the guide tube in a hole in the upper end fitting and provide a more rigid connection. The mid section tabs are received against the shoulder of a counterbore in the hole in the upper end fitting and serve to retain the guide tube and upper end fitting in the installed position. A sleeve or collet may be inserted into the counterbore to force the tabs inward and unlock the retainer and guide tube from the upper end fitting.

BRIEF DESCRIPTION OF THE DRAWINGS

For a further understanding of the nature and objects of the present invention reference should be had to the following description, taken in conjunction with the accompanying drawings in which like parts are given like reference numerals, and wherein.

DETAILED DESCRIPTION OF THE PREFERRED EMBODIMENT

Figure 1:
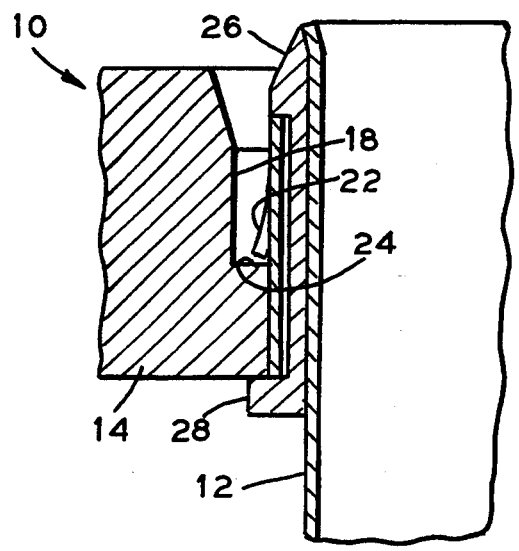
FIG. 1 is a sectional view of a guide tube installed in an upper end fitting using the invention.

Referring to the drawings, it is seen in FIG. 1 that the invention is generally indicated by the numeral 10. Locking arrangement 10 is integral to the guide tube 12 and upper end fitting 14 and is designed to be reusable without the release of loose parts in the system. Locking arrangement 10 is generally comprised of a retainer sleeve 16 that cooperates with a counterbore 18 in upper end fitting 14 to lock the guide tube and upper end fitting together in their installed position.

Figure 2:
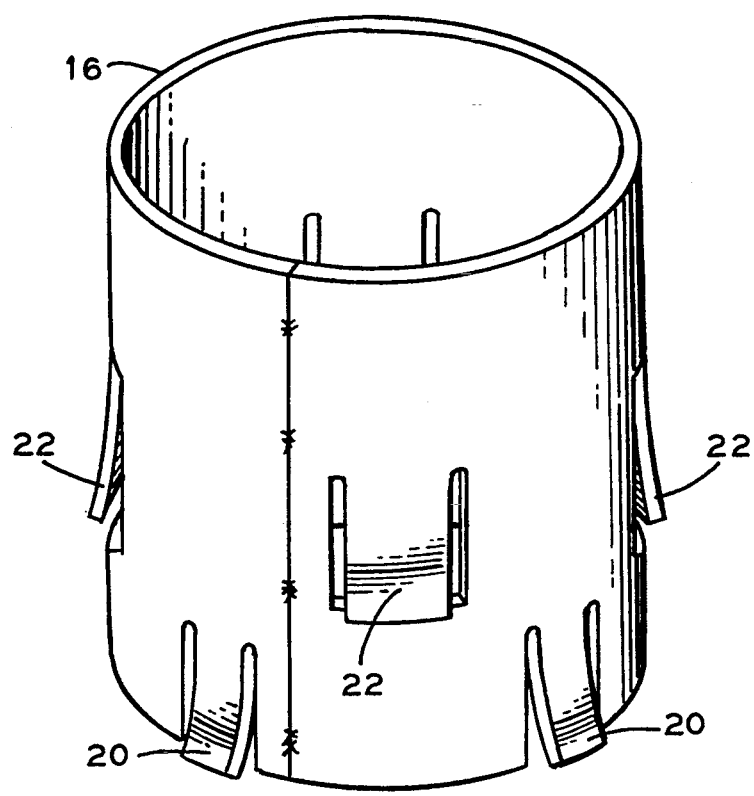
FIG. 2 is a perspective view of the retainer sleeve of the invention.

As seen in FIG. 2, retainer sleeve 16 is formed from a cylindrical tube that is provided with a plurality of flexible tabs 20, 22 that extend outwardly and are spaced apart around the circumference of the tube. Tabs 20 are located at the lower end of the tube while tabs 22 are located substantially at the mid section of the tube. Tabs 20 serve to center guide tube 12 in the bore through upper end fitting 14 and provide a more rigid connection. Tabs 22 serve to retain guide tube 12 and upper end fitting 14 in their installed position relative to each other. In the installed position, tabs 22 extend outwardly immediately above shoulder 24 of counterbore 18. This prevents upper end fitting 14 from being removed from guide tube 12. In order to provide the necessary resilient biasing action, retainer sleeve 16 is preferably made from a material that is used for springs and suitable for use in a nuclear application, such as nickel alloy 718.

As seen in FIG. 1, guide tube 12 is provided with an upper end sleeve 26 that serves as an attachment point for retainer sleeve 16. Retainer sleeve 16 may be attached to upper end sleeve 26 by any suitable method such as bonding or welding or may be integral with upper end sleeve 26. Since guide tubes are usually relatively thin (approximately 19 mils), an upper end sleeve is normally included on guide tubes to provide a point for attachment to the upper end fitting and to provide the necessary support for a shoulder stop 28 to prevent the upper end fitting from moving down the guide tube when the assembly is in the vertical position.

During assembly, the upper end fitting 14 is pushed over upper end sleeve 26 and sleeve retainer 16. The tabs 20 and 22 are forced inboard as the end fitting slides over the guide tube. When end fitting 14 is fully seated tabs 22 spring outboard above shoulder 24 and retain end fitting 14 and guide tube 12 in their relative installed positions. Tabs 20 maintain pressure against the walls of the main bore through end fitting 14 to retain guide tube 12 in a centered position and provide for a more rigid connection. Removal of end fitting 14 is accomplished by pushing a sleeve or collet over retainer sleeve 16 to force tabs 22 inboard and then sliding end fitting 14 upward until the lower main bore engages tabs 22 and allows final removal.

Figure 3:
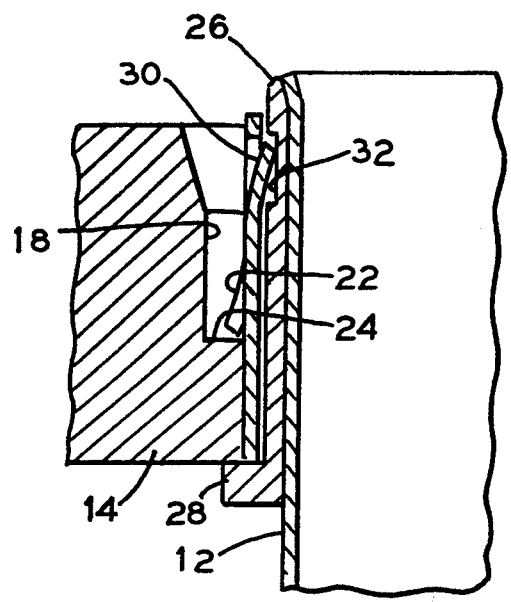
FIG. 3 is a sectional view of an alternate embodiment of the invention.
Figure 4:
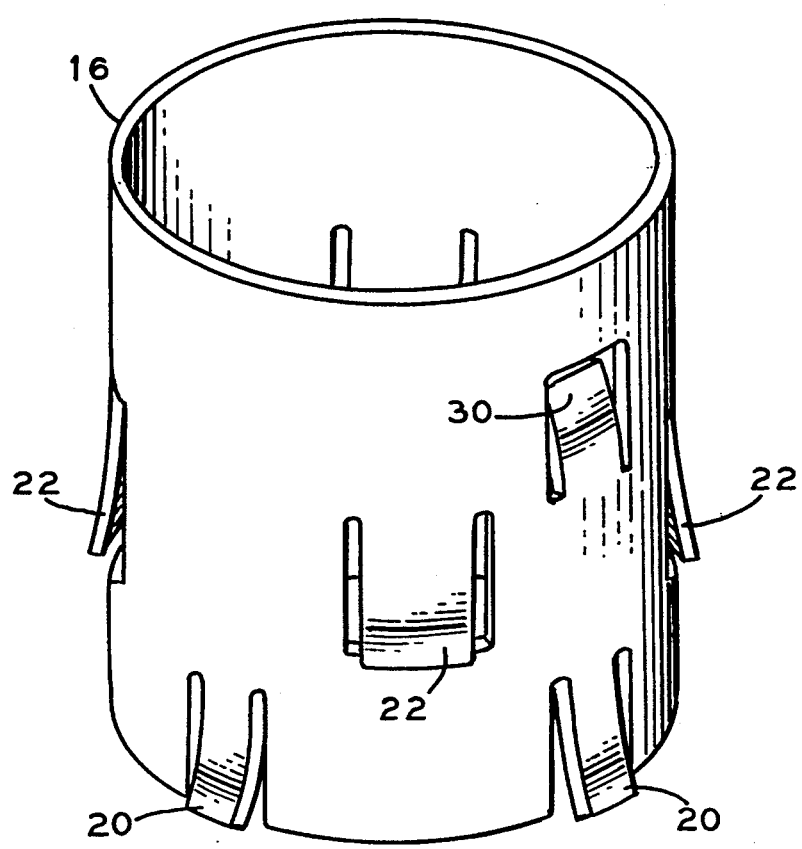
FIG. 4 is a perspective view of the retainer sleeve of the alternate embodiment.

FIG. 3 and 4 illustrate an alternate embodiment of the invention where retainer sleeve 16 is attached to upper end sleeve 26 by the use of inwardly facing tabs 30, only one of which is shown in FIG. 4. A plurality of inwardly facing tabs 30 are spaced apart around the circumference adjacent the upper end of retainer sleeve 16. The number, shape, and size of tabs 30 will vary depending on the reactor design. Upper end sleeve 26 is provided with groove 32 around the circumference adjacent the upper end that is sized to receive tabs 30 and hold retainer sleeve 16 in position on upper end sleeve 26.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a reconstitutable fuel assembly having an upper end fitting with a plurality of bores therethrough each sized to receive a guide tube and at least one control rod guide tube with the guide tube including an upper end sleeve having a radially extending first shoulder at the lower end for engagement with the lower surface of said upper end fitting, an integral reusable locking arrangement between the guide tube and upper end fitting comprising:
   a. said upper end fitting having a counterbore in each of said bores sized to receive a guide tube, the diameter of said counterbore being larger than the diameter of said bore so as to provide a second shoulder therebetween; and
   b. a cylindrical tube concentric with said guide tube and fixedly attached to said upper end sleeve said cylindrical tube having a plurality of flexible tabs extending outwardly and circumferentially spaced apart around the lower end and substantially at the mid section of said tube such that the tabs at the mid section of said tube are received in the counterbore in the upper end fitting for engagement with said second shoulder, the lower end surface of said tube being engaged with said first shoulder.

2. In a reconstitutable fuel assembly having an upper end fitting with a plurality of bores therethrough each sized to receive a guide tube and at least one control rod guide tube with the guide tube including an upper end sleeve having a radially extending first shoulder at the lower end for engagement with the lower surface of said upper end fitting, an integral reusable locking arrangement between the guide tube and upper end fitting comprising:
   a. said upper end sleeve having a groove around the circumference adjacent the upper end of said sleeve; and
   b. said upper end fitting having a counterbore in each of said bores sized to receive a guide tube, the diameter of said counterbore being larger than the diameter of said bore so as to define a second shoulder therebetween; and
   c. a cylindrical tube concentric with said sleeve, said cylindrical tube having a plurality of flexible tabs extending outwardly and circumferentially spaced apart around the lower end and substantially at the mid section of said tube such that the tabs at the mid section of said tube are received in the counterbore in the upper end fitting and for engagement with said second shoulder, a plurality of flexible tabs extending inwardly and upwardly and circumferentially spaced apart adjacent the upper end of said tube whereby said inwardly facing tabs are sized to be received in the groove around said sleeve, the lower end surface of said tube being engaged with said first shoulder.

* * * * *

UNITED STATES PATENT AND TRADEMARK OFFICE
CERTIFICATE OF CORRECTION

PATENT NO. : 5,367,548

DATED : November 22, 1994

INVENTOR(S) : Douglas J. Attix

It is certified that error appears in the above-identified patent and that said Letters Patent is hereby corrected as shown below:

Column 4, line 32, delete "and".

line 32, before "a", insert --and--.

Signed and Sealed this

Seventh Day of February, 1995

Attest:

BRUCE LEHMAN

Attesting Officer

Commissioner of Patents and Trademarks